(12) United States Patent
Ballard et al.

(10) Patent No.: US 6,183,031 B1
(45) Date of Patent: Feb. 6, 2001

(54) COUNTERBALANCE FOR TRAILER GATE AND METHOD FOR USING SAME

(76) Inventors: Kory M. Ballard, 810 SE. Michael; Bob J. Ballard, 1502 NW. 9th, both of Ankeny, IA (US) 50021

(*) Notice: Under 35 U.S.C. 154(b), the term of this patent shall be extended for 0 days.

(21) Appl. No.: 09/483,857

(22) Filed: Jan. 17, 2000

(51) Int. Cl.7 .................................................. B06P 1/267
(52) U.S. Cl. ............................................ 296/57.1; 296/50
(58) Field of Search ............................ 296/50, 57.1, 61; 414/537

(56) References Cited

U.S. PATENT DOCUMENTS

| | | | |
|---|---|---|---|
| 2,184,814 | * 12/1939 | Nagamatsu | 296/57.1 X |
| 2,653,845 | * 9/1953 | Benjamin | 296/61 |
| 5,954,383 | * 9/1999 | Beck et al. | 296/50 |

FOREIGN PATENT DOCUMENTS

| | | | |
|---|---|---|---|
| 510464 | * 8/1939 | (GB) | 296/61 |
| 7407939 | * 8/1939 | (NL) | 296/50 |

* cited by examiner

*Primary Examiner*—Joseph D. Pape
(74) *Attorney, Agent, or Firm*—Zarley, McKee, Thomte, Voorhees & Sease

(57) ABSTRACT

A trailer includes a foldable gate mounted for pivotal movement about a gate axis from a transport position wherein the gate is elevated for transporting to an unload position wherein the gate is lowered to permit removal of objects carried on the trailer. An elongated flexible member has its first end connected to the gate and its second end connected to a spring which is anchored to the trailer. The spring resists the force of gravity as the gate moves from its upper travel position to its lower unload position.

9 Claims, 4 Drawing Sheets

COUNTERBALANCE FOR TRAILER GATE AND METHOD FOR USING SAME

BACKGROUND OF THE INVENTION

The present invention relates to a counterbalance for trailer gate and method for using same.

One popular form of trailer currently in use is a trailer having a trailer gate pivotally mounted at its rear end. The gate pivots from a vertical position for transporting articles supported by the trailer to an unload position engaging the ground and providing a ramp for the removal of wheeled vehicles from the trailer bed of the trailer. These gates, in order to support heavy loads, are usually constructed of steel and have considerable weight. They are usually pivoted adjacent the bottom edge of the gate and the entire weight of the gate is supported above the pivotal point. Thus when they are lowered, there is a danger that the gate may fall and injure persons.

Therefore, a primary object of the present invention is the provision of an improved counterbalance for trailer gate and a method for using same.

A further object of the present invention is the provision of a counterbalance which may be formed as a kit capable of being mounted upon many conventional trailers.

A further object of the present invention is the provision of an improved counterbalance for a trailer gate which provides a counterbalance force throughout movement of the gate from a vertical transport position to a lowered position for unloading of the trailer.

A further object of the present invention is the provision of an improved counterbalance for trailer gates which may be added to conventional trailers and which provides a minimum of interfere with the load bearing capabilities of the trailer.

A further object of the present invention is the provision of an improved counterbalance for a trailer gate which improves the safety of the trailer and which reduces the likelihood of injury from a falling gate.

A further object of the present invention is the provision of an improved counterbalance for trailer gates, which is economical to manufacture, durable in use, and efficient in operation.

DETAILED DESCRIPTION OF THE PREFERRED EMBODIMENT

Figure 1:
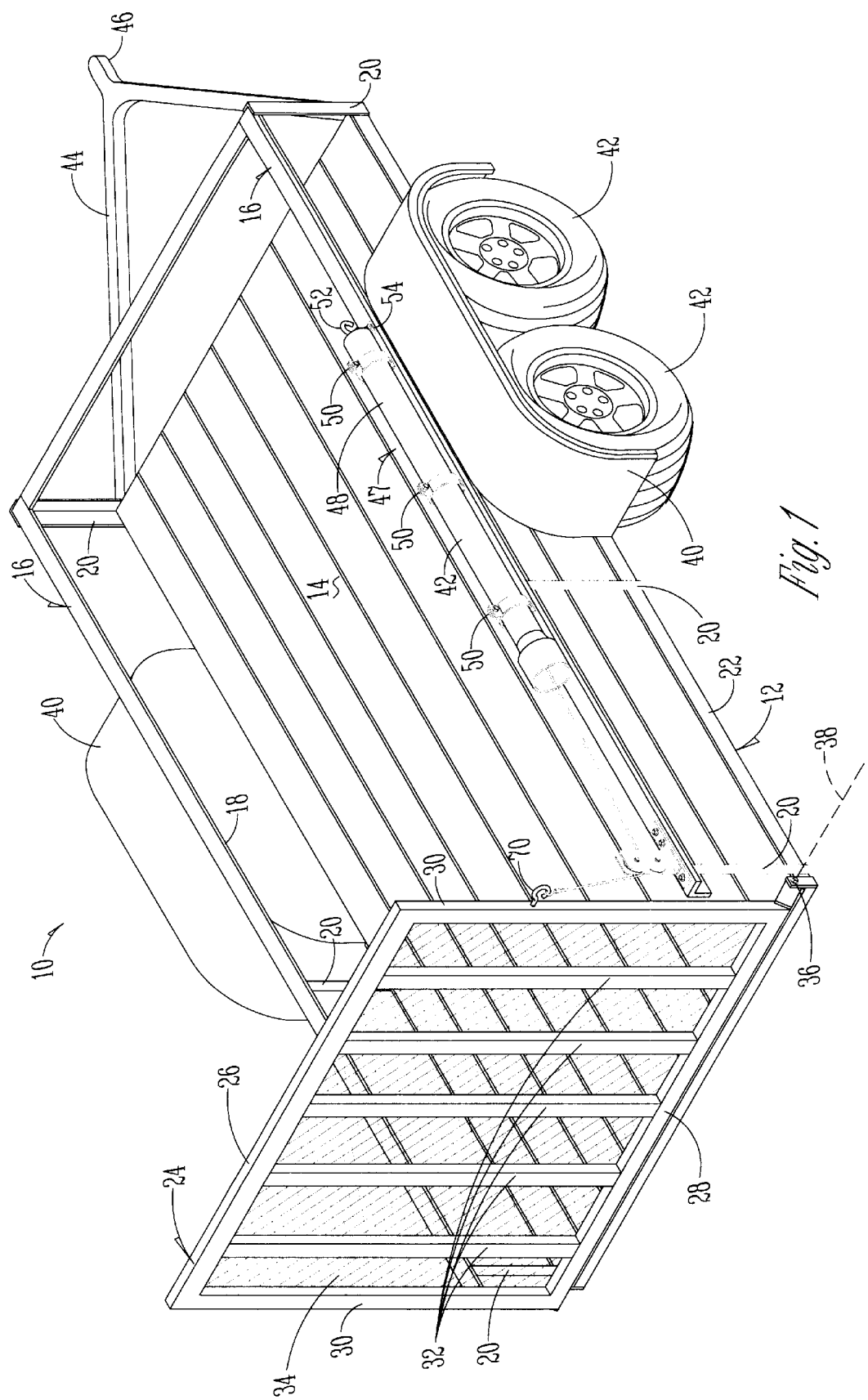
FIG. 1 is a perspective view of a trailer having the counterbalance of the present invention thereon.
Figure 2:
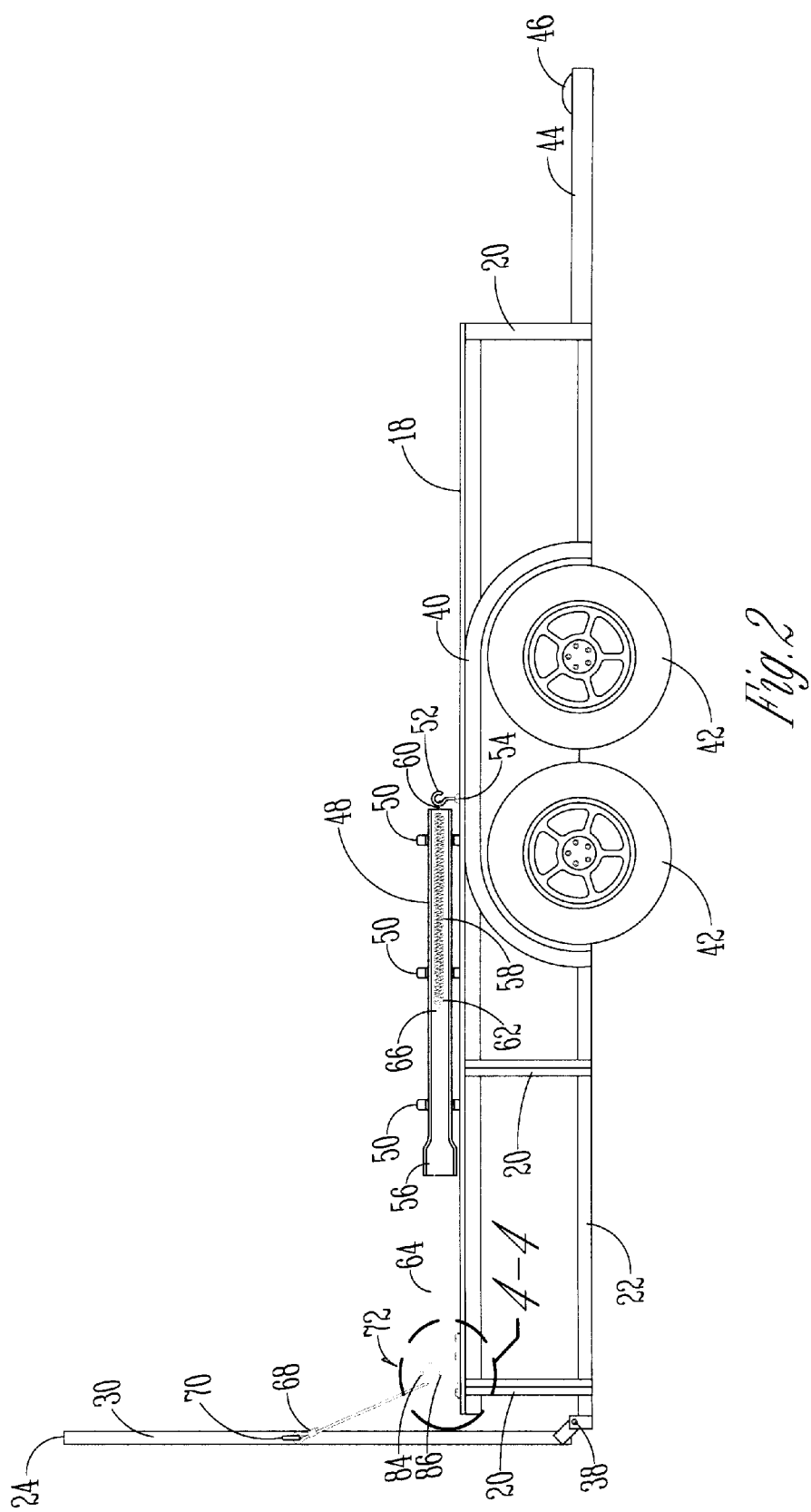
FIG. 2 is a side elevational view showing the counterbalance mechanism in cross section and showing the trailer gate in its elevated transport position.

Referring to the drawings the numeral 10 generally designates a trailer. Trailer 10 is comprised of a trailer frame 12 formed of a trailer bed 14 and side rails 16. Each side rail 16 comprises a horizontal top rail 18, and plurality of vertical rail supports 20, and a horizontal bottom rail 22.

A gate 24 includes an upper frame member 26, and a hinged frame member 28 joined by side frame members 30. A plurality of cross members 32 extend between rails 26, 28 and extend parallel to the side frame members 30. A strong screen mesh 34 covers the spaces between the cross frames 32 and the side frame members 30.

A hinge 36 is connected to the bottom frame member 28 of gate 24 and provides pivotal movement or hinged movement of gate 24 about a horizontal gate axis 38.

A pair of fenders 40 are mounted on the opposite sides frames 16 and surround a pair of wheels 42 which support the trailer 10 for transporting. The front of the trailer is provided with a tongue 44 and a hitch 46.

A counterbalance mechanism 47 is comprised of an elongated tube 48 having a plurality of clamps 50 which are attached to the horizontal top rail 18 and which secure the tube 48 in place above the horizontal top rail 18. An anchor hook 52 includes a shank 54 which is attached to the top rail 18. Tube 48 includes an elongated tube bore 56 extending therethrough, and included within the tube bore 56 is a coil spring 58 having a hook 60 which is hooked around the anchor hook 52 and having at its opposite end a hook 62 which is connected to a first end 66 of a cable 64. Cable 64 includes a second end 68 which is secured to anchor loop 70. Anchor loop 70 is attached to the side frame member 30 of gate 24.

Figure 4:
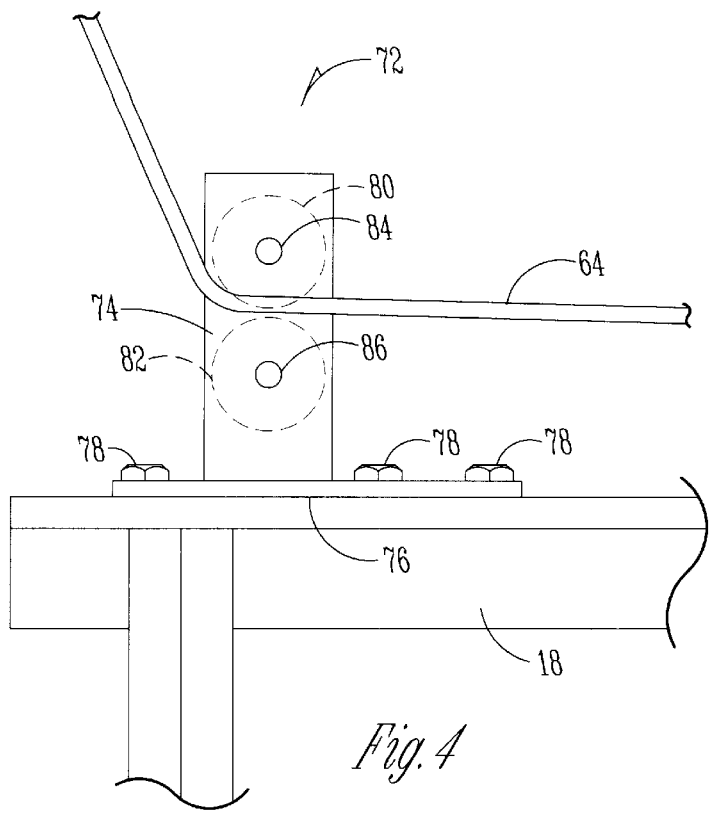
FIG. 4 is an enlarged sectional view of the pulley mechanism of the present invention, showing the position of the cable when the gate is in its elevated transport position.
Figure 5:
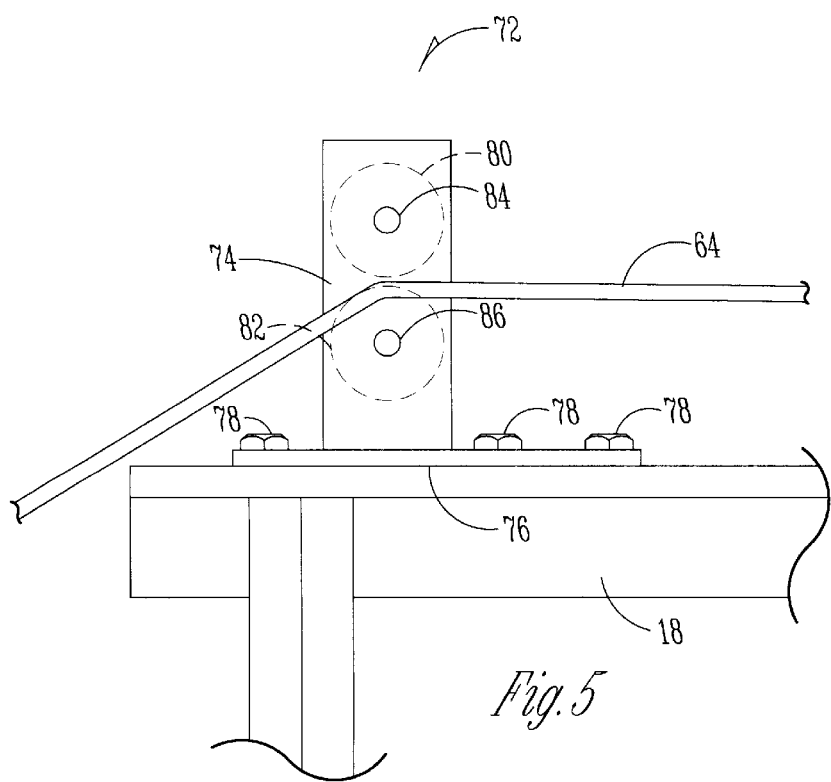
FIG. 5 is a view similar to FIG. 4, but showing the position of the cable when the trailer gate is in its lowered unload position.

A pulley mechanism 72 includes a pair of spaced apart side plates 74 (FIGS. 4 and 5) extending upwardly from a base plate 76. Bolts 78 attach base plate 76 to the horizontal top rail 18 between tube 48 and gate 24. Pulley mechanism 72 includes a first pulley 80 (FIG. 4) and a second pulley 82 which are mounted for rotation about a first pulley axis 84 and a second pulley axis 86 respectively. As can be seen in FIGS. 4 and 5 the cable 64 extends between the pulleys 80, 82. In FIG. 4 the gate 24 is in its upper most travel position similar to that shown in FIG. 1. In that position the cable 64 bears primarily against the pulley 80. However, in FIG. 5, when the gate 24 is in its lowered position shown in FIG. 3 the cable 64 bears against the second pulley 82 primarily. Together the pulleys 80, 82 require the cable to pass through a stationary location during the raising and lowering of the gate 24. The pulleys 80, 82 also permit the cable 64 to move longitudinally and rotate on the pulleys 80,82 during raising and lowering of the gate 24.

Figure 3:
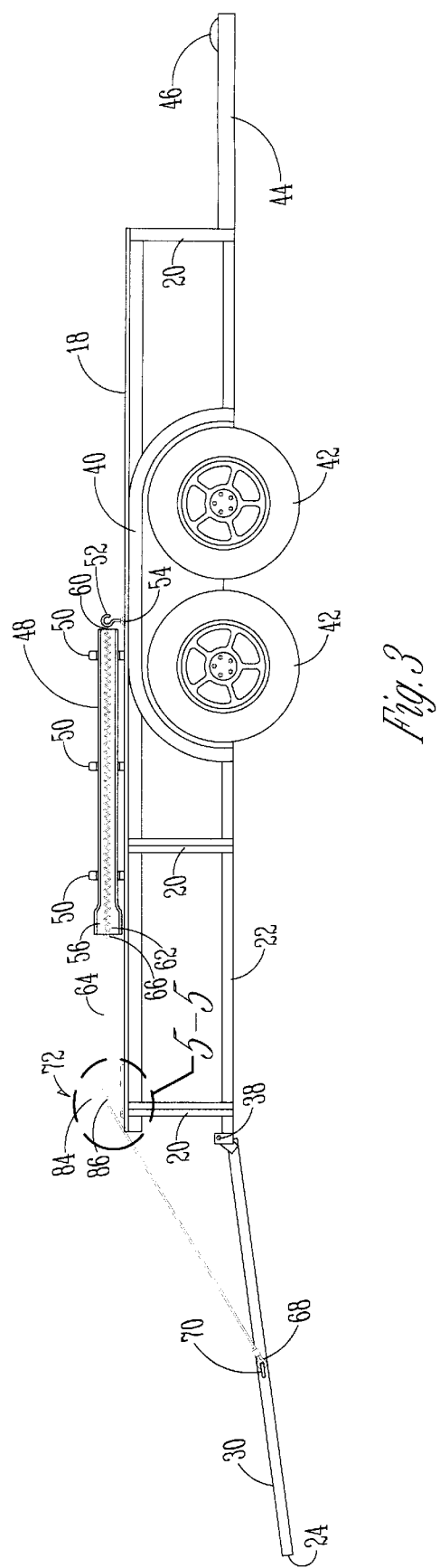
FIG. 3 is a view similar to FIG. 2, but showing the trailer gate in its lowered unload position.

This longitudinal movement of cable 64 is permitted by coil spring 58 which is in its compressed state when the gate 24 is in its upper most travel position, and which is in its extended state shown in FIG. 3 with the gate in its unloading position.

The counterbalance mechanism of the present invention improves the raising and lowering of the gate because it provides a counterbalance to the action of gravity on the gate. In absence of the counterbalance the gate is likely to fall by reason of gravity and injure persons in the vicinity of the trailer.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A counterbalance mechanism for use with a trailer having a trailer frame and a gate mounted to said trailer for pivotal movement from a transport position wherein said gate is elevated to an unload position wherein said gate is lower than when in said transport position, said counterbalance mechanism comprising:

an anchor member adapted for attachment to said trailer frame;

an elongated flexible member having first and second ends and an intermediate portion therebetween;

a spring connected to said first end of said flexible member and to said anchor member;

a pair of opposing pulleys rotatably mounted on said trailer frame and juxtapositioned with each other so as to guide and support the intermediate portion of said cable therebetween;

a connector attached to said second end of said flexible member and being adapted for attachment to said gate at a point spaced from said gate axis, whereby said spring will provide a counterbalance force opposing movement of said first end of said flexible member away from said anchor member during movement of said gate between said transport and said unload positions.

2. A trailer having a foldable gate comprising:

a trailer bed having a forward end, a rear end, and opposite bed sides;

a gate pivotally mounted to said trailer bed for pivotal movement about a gate axis from a transport position wherein said gate is elevated for transporting to an unload position wherein said gate is lowered to permit removal of objects carried on said trailer bed;

an elongated flexible member having a first end attached to said gate at a point spaced from said gate axis and having a second end;

a spring connected to said second end of said flexible member and to said trailer bed, said spring yieldably resisting movement of said gate from said transport position to said unload position;

a pulley mechanism connected to said trailer bed and having at least a first pulley mounted for rotation about a first pulley axis parallel to said gate axis, said flexible member engaging said first pulley during at least a portion of the time that said gate is moving between said transport position and said unload position;

said first pulley being on one side of said flexible member;

said pulley mechanism including a second pulley mounted for rotation about a second pulley axis parallel to said gate axis; and said second pulley being on the opposite side of said flexible member from said first pulley.

3. A trailer according to claim 2 wherein said first pulley engages said flexible member during movement of said gate from said transport position to said load position, and said second pulley engages said flexible member during movement of said gate from said load position to said transport position.

4. A trailer according to claim 3 wherein said spring permits said cable to move longitudinally during movement of said gate between said transport position and said unload position.

5. A trailer according to claim 2 wherein a gravity force acts on the weight of said gate during movement between said transport and said unload positions, said spring providing a counterbalance force to said gate through said flexible member, said counterbalance force opposing said gravity force.

6. A method for counterbalancing a gate pivotally mounted to a trailer frame for pivotal movement about a gate axis from a transport position wherein said gate is elevated for transporting of said trailer frame to an unload position wherein said gate is lower than when in said transport position for removal of objects from said trailer frame, said method comprising:

providing a cable including first and second ends and an intermediate portion therebetween;

attaching said first end of said cable to said gate at an attachment point spaced from said gate axis;

attaching said second end of said cable to a spring;

attaching said spring to said trailer frame, whereby said spring will yieldably oppose movement of said second end of said cable away from said spring in response to movement of said gate between said transport position and said unload position; and positioning a first pulley on one side of said intermediate portion of said cable and a second pulley on the opposite side of said intermediate portion of said cable.

7. A method according to claim 6 and further comprising attaching said first and second pulleys to said trailer frame between said spring and said gate.

8. A method according to claim 7 and further comprising rotating said first and second pulleys about first and second pulley axes which are parallel to said gate axis whenever said gate moves between said transport position and said unload position.

9. A method according to claim 8 wherein said attachment point of said cable to said gate is above said first and second pulley axes when said gate is in said transport position and is below said first and second pulley axes when said gate is in said unload position.

* * * * *